(12) United States Patent  (10) Patent No.: US 8,733,493 B2
Shiina et al.  (45) Date of Patent: May 27, 2014

(54) HYDRAULIC POWER STEERING SYSTEM (71) Applicant: JTEKT Corporation, Osaka (JP)

(72) Inventors: Akihiko Shiina, Kashihara (JP);
Keisuke Izutani, Yamatotakada (JP);
Masahiko Sakamaki, Yao (JP)

(73) Assignee: JTEKT Corporation, Osaka (JP)

( * ) Notice: Subject to any disclaimer, the term of this patent is extended or adjusted under 35 U.S.C. 154(b) by 53 days.

(21) Appl. No.: 13/664,005

(22) Filed: Oct. 30, 2012

(65) Prior Publication Data
US 2013/0112492 A1 May 9, 2013

(30) Foreign Application Priority Data
Nov. 8, 2011 (JP) ................................. 2011-244728

(51) Int. Cl.
B62D 5/09 (2006.01)

(52) U.S. Cl.
USPC .......................................... 180/422; 180/441

(58) Field of Classification Search
USPC .................................. 180/421, 422, 423, 441
See application file for complete search history.

(56) References Cited

U.S. PATENT DOCUMENTS

| 2010/0018796 A1* | 1/2010 | Peterson | 180/422 |
| 2012/0097471 A1* | 4/2012 | Sakamaki et al. | 180/422 |
| 2012/0247864 A1* | 10/2012 | Kubo et al. | 180/422 |

FOREIGN PATENT DOCUMENTS

JP A-2006-306239 11/2006

* cited by examiner

*Primary Examiner* — Kevin Hurley
(74) *Attorney, Agent, or Firm* — Oliff PLC (57) ABSTRACT A hydraulic power steering system includes a rotation angle sensor that detects a rotation angle of a shaft. A rotary valve includes a valve element that rotates together with the shaft of an electric motor and a housing that has an internal space connected to oil passages. A control unit reflects an output from the rotation angle sensor on control of the electric motor.

6 Claims, 7 Drawing Sheets

HYDRAULIC POWER STEERING SYSTEM

INCORPORATION BY REFERENCE/RELATED APPLICATION

This application claims priority to Japanese Patent Application No. 2011-244728 filed on Nov. 8, 2011 the disclosure of which, including the specification, drawings and abstract, is incorporated herein by reference in its entirety.

BACKGROUND OF THE INVENTION

1. Field of the Invention

The invention relates to a hydraulic power steering system that includes an oil pump, a flow rate control valve that controls hydraulic fluid that is supplied from the oil pump to a steering assist device, an electric motor that drives the flow rate control valve, and a control unit that controls the electric motor.

2. Discussion of Background

A power steering system described in Japanese Patent Application Publication No. 2006-306239 (JP 2006-306239 A) includes a cylindrical valve body, a motor that applies rotational force to the valve body, and a steering control unit. The power steering system detects a steering torque applied to a steering member, and controls a hydraulic fluid pressure that is supplied to or drained from a steering assist power cylinder with the use of a hydraulic control valve that operates on the basis of the detected steering torque. An actuator for the hydraulic control valve is driven on the basis of the detected steering torque. The steering control unit computes a rotational force of the motor, which is required to generate steering assist force, on the basis of the detected steering torque obtained from a torque sensor, and supplies the motor with a current corresponding to the rotational force.

The steering assist device applies force to a steered shaft on the basis of the amount of the hydraulic fluid received via the flow rate control valve. Therefore, in order to appropriately assist the operation of a steering wheel, it is desirable to accurately control the supply amount of hydraulic fluid. However, JP 2006-306239 A does not describe that the power steering system accurately controls the supply amount of hydraulic fluid.

SUMMARY OF THE INVENTION

The invention provides a hydraulic power steering system that is able to accurately control the amount of the hydraulic fluid that is supplied to a steering assist device.

According to a feature of an example of the invention, a rotary valve of a flow rate control valve rotates together with an output shaft of an electric motor, and a rotation angle sensor detects a rotation angle of the output shaft of the electric motor. A control unit reflects an output from the rotation angle sensor on control of the electric motor. Therefore, it is possible to accurately execute angular control of the rotary valve of the flow rate control valve. As a result, it is possible to accurately control the supply amount of the hydraulic fluid.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, embodiments of the invention will be described with reference to the accompanying drawings.

Figure 1:
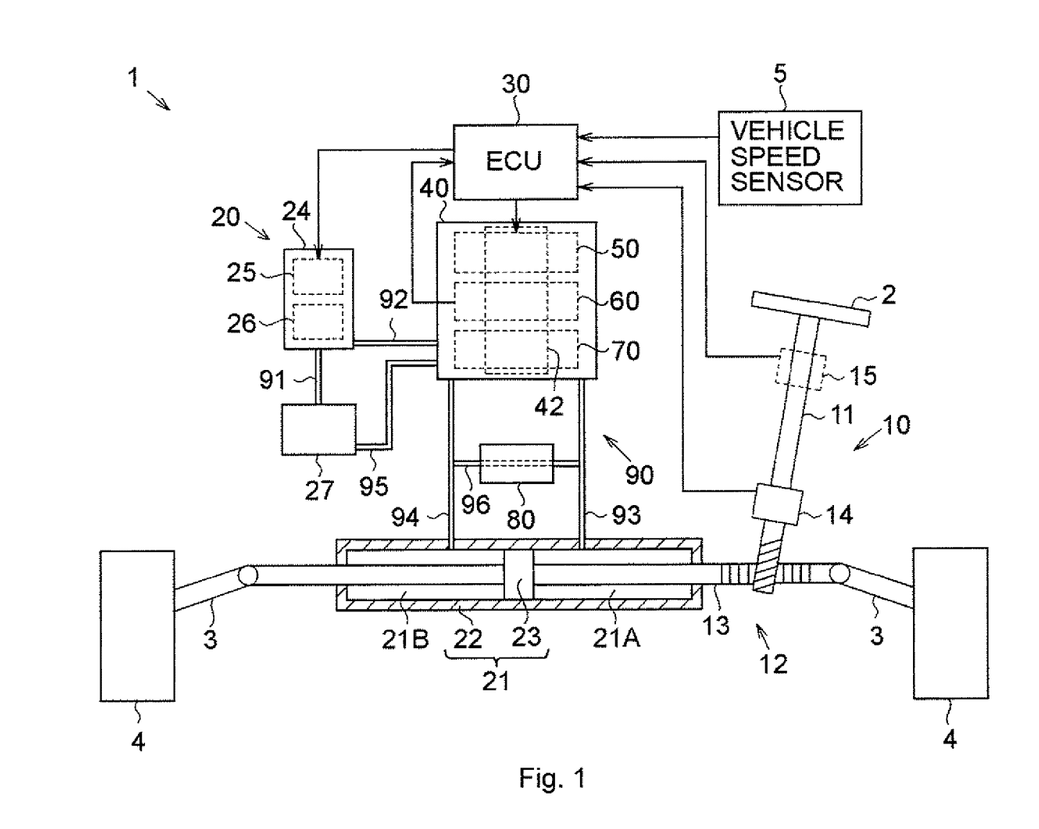
FIG. 1 is a view that schematically shows the overall configuration of a hydraulic power steering system according to an embodiment of the invention.

The configuration of a hydraulic power steering system 1 will be described with reference to FIG. 1. The hydraulic power steering system 1 includes a steering device 10, an assist device 20, and a control unit 30. The steering device 10 transmits the operation of a steering wheel 2 to steered wheels 4. The assist device 20 supplies force required to assist the operation of the steering wheel 2. The control unit 30 controls the assist device 20.

The steering device 10 includes a steering shaft 11, a rack-and-pinion mechanism 12 and a rack shaft 13. The steering shaft 11 rotates together with the steering wheel 2. The rack-and-pinion mechanism 12 converts the rotation of the steering shaft 11 into a linear motion. The rack shaft 13 moves in its axial direction in accordance with the operation of the rack-and-pinion mechanism 12.

The control unit 30 is an electronic control unit (ECU) that includes an integrated circuit. The control unit 30 controls an electric pump 24 of the assist device 20 and an electric valve device 40 on the basis of signals output from a torque sensor 14, a steering angle sensor 15 and a vehicle speed sensor 5.

The torque sensor 14 outputs a signal, which corresponds to a steering torque applied to the steering shaft 11, to the control unit 30. The steering angle sensor 15 outputs a signal, which corresponds to the rotation angle, that is, the steering angle, of the steering shaft 11, to the control unit 30. The vehicle speed sensor 5 outputs a signal, which corresponds to the rotation speed of the steered wheels 4, that is, the vehicle speed, to the control unit 30.

The hydraulic power steering system 1 operates as follows. When a driver operates the steering wheel 2, the steering shaft 11 rotates together with the steering wheel 2. The rack-and-pinion mechanism 12 converts the rotational motion of the steering shaft 11 into an axial linear motion of the rack shaft 13. Therefore, the rack shaft 13 moves in the axial direction by the force transmitted from the rack-and-pinion mechanism 12. In accordance with the movement of the rack shaft 13 in the axial direction, the tie rods 3 change the steered angle of the steered wheels 4.

In addition, when the driver operates the steering wheel 2, the assist device 20 applies axial force to the rack shaft 13. In this way, a force required for the operation of the steering wheel 2 to move the rack shaft 13 in the axial direction is reduced. That is, the assist device 20 generates a force required to assist the operation of the steering wheel 2.

The configuration of the assist device 20 will be described. The assist device 20 includes a power cylinder 21, the electric pump 24, the electric valve device 40 and a reservoir unit 27. The power cylinder 21 applies hydraulic pressure to the rack shaft 13. The electric pump 24 supplies hydraulic fluid to the power cylinder 21. The electric valve device 40 controls the flow of the hydraulic fluid to the power cylinder 21. The reservoir unit 27 stores the hydraulic fluid. Note that the power cylinder 21 may function as "steering assist device" according to the invention. The electric pump 24 may function as "oil pump" according to the invention.

The power cylinder 21 includes a housing 22 and a piston 23. The rack shaft 13 passes through the housing 22. The piston 23 is fixed to the rack shaft 13. The piston 23 partitions the space inside the housing 22 into a first hydraulic chamber 21A and a second hydraulic chamber 21B.

The electric pump 24 includes an electric motor 25 and a pump 26 that is coupled to an output shaft of the electric motor 25. A three-phase brushless motor is used as the electric motor 25. As the electric motor 25 drives the pump 26, the electric pump 24 draws the hydraulic fluid from the reservoir unit 27, and discharges the hydraulic fluid to the power cylinder 21 via the electric valve device 40.

The electric valve device 40 includes an electric motor 50, a rotation angle sensor 60 and a rotary valve 70. The rotation angle sensor 60 detects the rotation angle of the electric motor 50. Note that the rotary valve 70 may function as "flow rate control valve" according to the invention.

As the electric motor 50 drives the rotary valve 70, the electric valve device 40 controls a hydraulic fluid supply/drain mode in which the hydraulic fluid is supplied to or drained from the power cylinder 21. The control of a hydraulic fluid supply/drain mode, which is executed by the electric valve device 40, includes the following three controls, (a) One of the first hydraulic chamber 21A and the second hydraulic chamber 21B is set as a hydraulic fluid supply port, and the flow rate of the hydraulic fluid flowing into the hydraulic fluid supply port is controlled.

(b) The other one of the first hydraulic chamber 21A and second hydraulic chamber 21B (that is, the one different from the hydraulic fluid supply port) is set as a hydraulic fluid drain port, and the flow rate of the hydraulic fluid flowing out of the hydraulic fluid drain port is controlled.

(c) The hydraulic fluid supply port that is one of the first hydraulic chamber 21A and the second hydraulic chamber 21B and the hydraulic fluid drain port that is the other one of the first hydraulic chamber 21A and the second hydraulic chamber 21B are controlled to be interchanged.

The reservoir unit 27 includes an oil tank that stores the hydraulic fluid drained from the power cylinder 21 via the electric valve device 40. When the hydraulic fluid supplied to one of the hydraulic chambers 21A, 21B of the power cylinder 21 is drained from the other one of the hydraulic chambers 21A, 21B, the hydraulic fluid returns to the electric pump 24.

The assist device 20 includes a bypass valve 80 and an oil passage 90. Through the bypass valve 80, the hydraulic fluid is circulated between the first hydraulic chamber 21A and the second hydraulic chamber 21B without passing through the electric valve device 40. The hydraulic fluid flows through the oil passage 90.

The oil passage 90 includes oil passages 91 to 95. Note that the pump discharge oil passage 92 may function as "first oil passage" according to the invention. In addition, the first supply oil passage 93 and the second supply oil passage 94 may function as "second oil passage" according to the invention.

The oil passages 91 to 95 will be described with reference to FIG. 1 and FIG. 2. The pump introducing oil passage 91 connects the reservoir unit 27 and the electric pump 24 with each other. The electric pump 24 draws the hydraulic fluid from the reservoir unit 27 through the pump introducing oil passage 91.

The pump discharge oil passage 92 connects the electric pump 24 and a pump port 72 of the electric valve device 40 with each other. The electric pump 24 discharges the hydraulic fluid to the electric valve device 40 through the pump discharge oil passage 92.

The first supply oil passage 93 connects a first port 73 of the electric valve device 40 and the first hydraulic chamber 21A of the power cylinder 21 with each other. The electric valve device 40 supplies the hydraulic fluid to the first hydraulic chamber 21A through the first supply oil passage 93.

The second supply oil passage 94 connects a second port 74 of the electric valve device 40 and the second hydraulic chamber 21B of the power cylinder 21 with each other. The electric valve device 40 supplies the hydraulic fluid to the second hydraulic chamber 21B through the second supply oil passage 94.

The drain oil passage 95 connects a tank port 75 of the electric valve device 40 and the reservoir unit 27 with each other. The electric valve device 40 drains the hydraulic fluid to the reservoir unit 27 through the drain oil passage 95.

The communication oil passage 96 connects the first supply oil passage 93 and the second supply oil passage 94 with each other. When the communication oil passage 96 is open and the hydraulic pressure in the first hydraulic chamber 21A differs from the hydraulic pressure in the second hydraulic chamber 21B, the hydraulic fluid flows through the communication oil passage 96 between the hydraulic chambers 21A and 21B.

The bypass valve 80 is a fail-safe valve that changes the state of connection between the first supply oil passage 93 and the second supply oil passage 94, that is, the state of connection between the first hydraulic chamber 21A and the second hydraulic chamber 21B. The bypass valve 80 closes the communication oil passage 96 to interrupt the communication between the first supply oil passage 93 and the second supply oil passage 94, thereby interrupting the communication between the first hydraulic chamber 21A and the second hydraulic chamber 21B. In addition, the bypass valve 80 opens the communication oil passage 96 to allow the communication between the first supply oil passage 93 and the second supply oil passage 94, thereby allowing the communication between the first hydraulic chamber 21A and the second hydraulic chamber 21B.

The electric valve device 40 changes the state of connection among the pump discharge oil passage 92, the first supply oil passage 93, the second supply oil passage 94 and the drain oil passage 95 as follows. That is, the electric valve device 40 connects one of the first supply oil passage 93 and the second supply oil passage 94 to the pump discharge oil passage 92, and connects the other one to the drain oil passage 95. Then, the connection states are changed, and the one of the first supply oil passage 93 and the second supply oil passage 94 is connected to the drain oil passage 95, and the other one is connected to the pump discharge oil passage 92. Thus, the hydraulic fluid supply port is changed. In this way, the electric valve device 40 changes the state of connection between the pump discharge oil passage 92, in which the hydraulic fluid flows in one direction, and the first supply oil passage 93 and second supply oil passage 94. Furthermore, by changing the flow passage area for the hydraulic fluid, the amount of the hydraulic fluid that is supplied to the hydraulic fluid supply port is controlled.

The detailed configuration of the electric valve device 40 will be described with reference to FIG. 2 to FIG. 13. As shown in FIG. 2, the electric valve device 40 includes a housing 41, a shaft 42 and a cover 43. The housing 41 accommodates the electric motor 50, the rotation angle sensor 60 and the rotary valve 70. The shaft 42 serves as both a rotor 54 of the electric motor 50 and a valve element 76 of the rotary valve 70. The cover 43 covers the shaft 42 together with the housing 41. Note that the shaft 42 may function as "output shaft".

Inside the housing 41, the electric motor 50, the rotation angle sensor 60 and the rotary valve 70 are arranged in this order along the axial direction of the shaft 42. The housing 41 has a valve chamber 41A, a machine chamber 41B and an oil seal 44. The valve chamber 41A accommodates the rotary valve 70. The machine chamber 41B accommodates the electric motor 50 and the rotation angle sensor 60. Note that the valve chamber 41A may function as "first accommodation chamber". In addition, the machine chamber 41B may function as "second accommodation chamber".

The oil seal 44 partitions the space inside the housing 41 into the valve chamber 41A and the machine chamber 41B. The oil seal 44 is located between the rotation angle sensor 60 and the rotary valve 70 provided next to each other in the axial direction of the shaft 42, and between the inner face of the housing 41 and the outer face of the shaft 42.

One end of the shaft 42 is rotatably supported by a bearing 45 provided on the cover 43. In addition, the other end of the shaft 42 is rotatably supported by a bearing 46 provided at the bottom of the housing 41. In addition, a middle portion of the shaft 42 is rotatably supported by a bearing 47. The bearings 46, 47 support respective ends of the valve element 76 of the rotary valve 70. The hydraulic fluid that flows into the valve chamber 41A also functions as lubricating oil for the bearings 46, 47 provided in the valve chamber 41A.

The shaft 42 includes a motor rotor portion 42A, a rotation angle detected portion 42B and a valve element portion 42C. The motor rotor portion 42A is formed as the rotor 54 of the electric motor 50. The rotation angle of the rotation angle detected portion 42B is detected by the rotation angle sensor 60. The valve element portion 42C is formed as the valve element 76 of the rotary valve 70. The shaft 42 is made of a single material, and the motor rotor portion 42A, the rotation angle detected portion 42B and the valve element portion 42C are formed as a single-piece member. An internal space 42S is formed inside the valve element portion 42C. The hydraulic fluid flows through the internal space 42S.

Figure 2:
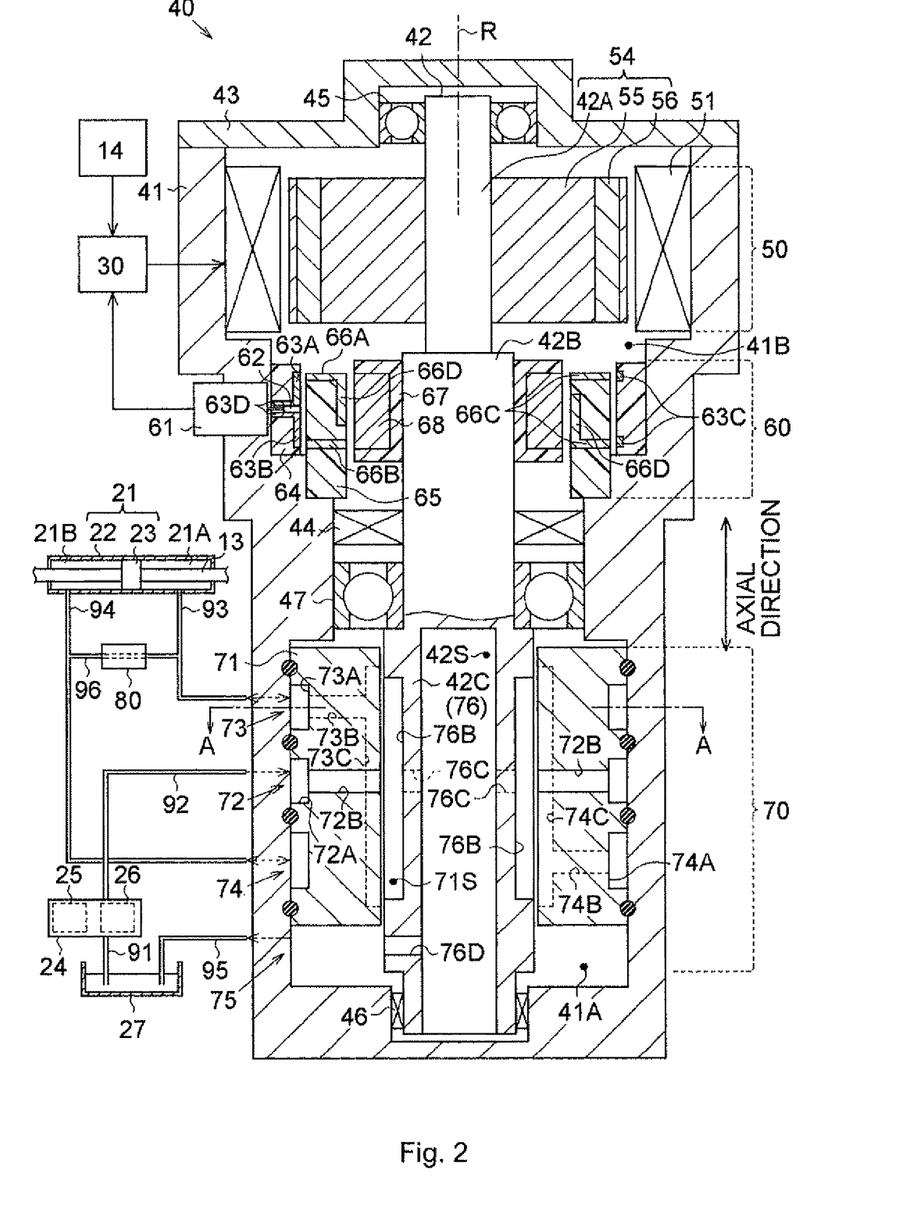
FIG. 2 is a view that shows the sectional structure of an electric valve device, taken along a plane that passes through a rotation central axis.

As shown in FIG. 2, the electric motor 50 is formed of a stator 51 and the rotor 54. The stator 51 is fixed to the housing 41. The rotor 54 rotates relative to the stator 51. The rotor 54 includes the motor rotor portion 42A of the shaft 42.

Figure 3:
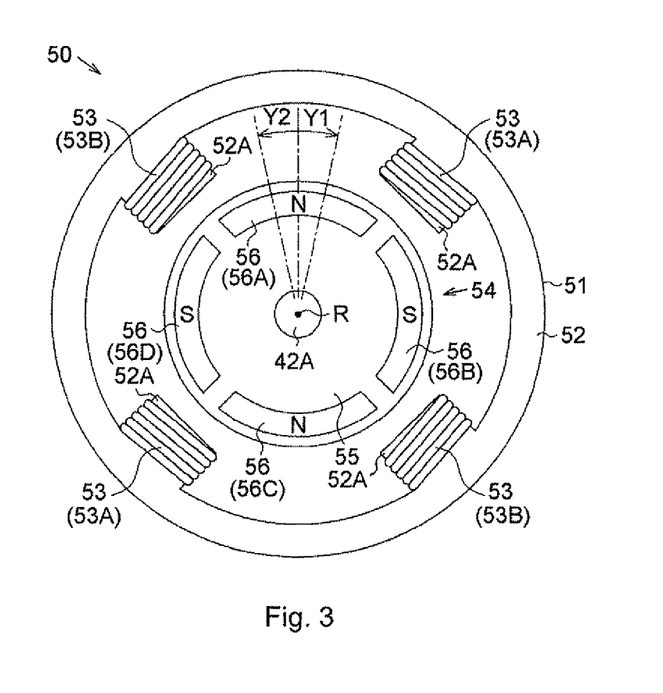
FIG. 3 is a sectional view that shows the sectional structure of the electric valve device, taken along a plane perpendicular to the rotation central axis.

As shown in FIG. 3, the electric motor 50 has a two-phase brushless motor structure. The stator 51 has a stator core 52 and coils 53. The stator core 52 is formed in a cylindrical shape and has teeth 52A on its inner periphery. The coils 53 are formed of conductive wires wound around the teeth 52A. The coils 53 that constitute two phases are formed of first-phase coils 53A and second-phase coils 53B. The current that flows through the coils 53 is controlled by a switching element (not shown). The current is supplied alternately to the first-phase coils 53A and the second-phase coils 53B by the switching element. That is, when the first-phase coils 53A are energized, the second-phase coils 53B are not energized; whereas, when the second-phase coils 53B are energized, the first-phase coils 53A are not energized.

The rotor 54 includes a rotor core 55 and a permanent magnet 56. The rotor core 55 is fixed to the motor rotor portion 42A. The permanent magnet 56 is attached to the rotor core 55. The permanent magnet 56 that constitutes four poles is formed of a first magnet 56A, a second magnet 56B, a third magnet 56C and a fourth magnet 56D. The magnets 56A to 56D are provided at equal intervals in the rotation direction of the rotor 54. The motor rotor portion 42A and the rotor core 55 rotate together with each other about a rotation central axis R by a magnetic field generated when the coils 53 of the stator 51 are energized. In this way, the electric motor 50 rotates the shaft 42 about the rotation central axis R. That is, as the rotor 54 rotates, the shaft 42 that includes the rotation angle detected portion 42B and the valve element portion 42C rotates.

Figure 4A:
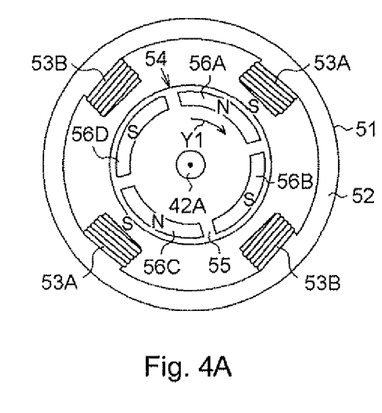
FIG. 4A is a sectional view that shows the sectional structure of the electric valve device, taken along the plane perpendicular to the rotation central axis, when a rotation position of a rotor is a first rotation position.

The rotation of the rotor 54 will be described with reference to FIG. 3, FIG. 4A and FIG. 4B. The rotor 54 is configured to rotate within a range smaller than 360° (for example, within the range of 6°) when a magnetic field is generated by supplying current to the first-phase coils 53A or the second-phase coils 53B. That is, a rotatable range of the shaft 42 is smaller than 360°.

As shown in FIG. 3, the position of the rotor 54 at the time when the magnets 56A to 56D of the rotor 54 are each located between the first-phase coil 53A and the second-phase coil 53B of the stator 51 in the rotation direction of the rotor 54 is defined as "rotation neutral position".

In the electric valve device 40, the rotation position of the rotor 54 with respect to the stator 51 is changed by driving the electric motor 50 as follows. As shown in FIG. 4A, when the first-phase coils 53A are energized, the first-phase coils 53A attract the first magnet 56A and the third magnet 56C, and the rotor 54 rotates from the rotation neutral position shown in FIG. 3 in the direction of an arrow Y1. The position of the rotor 54, shown in FIG. 4A, which has been rotated from the rotation neutral position as described above is defined as "first rotation position".

Figure 4B:
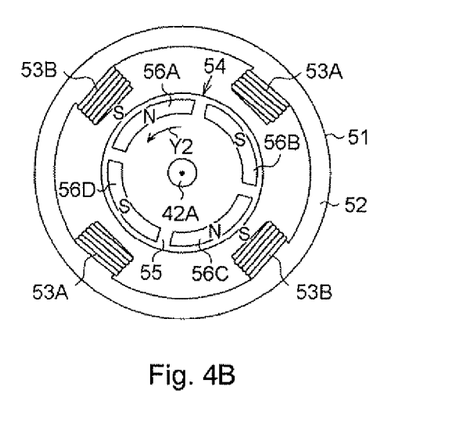
FIG. 4B is a sectional view that shows the sectional structure of the electric valve device, taken along the plane perpendicular to the rotation central axis, when the rotation position of the rotor is a second rotation position.

As shown in FIG. 4B, when the second-phase coils 538 are energized, the second-phase coils 53B attract the first magnet 56A and the third magnet 56C, and the rotor 54 rotates from the rotation neutral position shown in FIG. 3 in the direction of an arrow Y2. The position of the rotor 54, shown in FIG.

4B, which has been rotated from the rotation neutral position as described above is defined as "second rotation position".

Thus, the position of the rotor 54 changes from the rotation neutral position to the first rotation position or the second rotation position. In addition, when the rotor 54 is in the first rotation position, by energizing the second-phase coils 53B, the position of the rotor 54 is changed to the rotation neutral position or to the second rotation position via the rotation neutral position. In addition, when the rotor 54 is in the second rotation position, by energizing the first-phase coils 53A, the position of the rotor 54 is changed to the rotation neutral position or to the first rotation position via the rotation neutral position.

As shown in FIG. 2, the rotation angle sensor 60 includes a holder 61, a Hall element 62, magnetic flux concentration rings 63A, 63B and a resin mold element 64. The holder 61 is provided on the housing 41. The Hall element 62 protrudes from the holder 61 into the housing 41. The Hall element 62 is sandwiched between the magnetic flux concentration rings 63A, 63B. The magnetic flux concentration rings 63A, 63B are insert-molded in the resin mold element 64.

The holder 61 incorporates, for example, a circuit substrate to which the Hall element 62 is connected. The Hall element 62 is formed of a Hall IC that detects magnetic fluxes by utilizing Hall effect. The Hall element 62 outputs an electric signal that corresponds to a magnetic flux density to the control unit 30.

Figure 5:
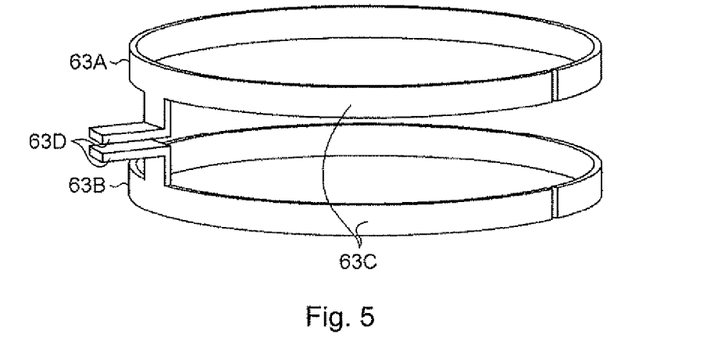
FIG. 5 is a perspective view that shows the perspective structure of magnetic flux concentration rings of a rotation angle sensor.

The first magnetic flux concentration ring 63A and the second magnetic flux concentration ring 63B are spaced apart from each other in the axial direction of the shaft 42. As shown in FIG. 5, each of the magnetic flux concentration rings 63A, 63B has an annular portion 63C and a protruding portion 63D. Each protruding portion 63D protrudes from the corresponding annular portion 63C in the axial direction of the annular portion 63C and then extends outward in the radial direction of the annular portion 63C. The Hall element 62 (see FIG. 2) is provided between the protruding portions 63D of the respective magnetic flux concentration rings 63A, 63B.

As shown in FIG. 2, the magnetic flux concentration rings 63A, 63B are embedded in the resin mold element 64, and the resin mold element 64 and the magnetic flux concentration rings 63A, 63B are integrated with each other. The resin mold element 64 is fixed to the housing 41. Thus, the magnetic flux concentration rings 63A, 63B are fixed to the housing 41.

The rotation angle sensor 60 includes a resin mold element 65, yoke rings 66A, 66B, a resin mold element 67 and a permanent magnet 68. The resin mold element 65 and the yoke rings 66A, 66B are fixed to the housing 41. The resin mold element 67 and the permanent magnet 68 are fixed to the rotation angle detected portion 42B of the shaft 42.

The yoke rings 66A, 66B are embedded in the resin mold element 65 and integrated with the resin mold element 65. The resin mold element 65 is fixed to the housing 41. Thus, the yoke rings 66A, 66B are fixed to the housing 41.

The permanent magnet 68 is embedded in the resin mold element 67 and integrated with the resin mold element 67. The resin mold element 67 is fixed to the rotation angle detected portion 42B of the shaft 42. Thus, the permanent magnet 68 is fixed to the shaft 42.

The first yoke ring 66A and the second yoke ring 66B are spaced apart from each other in the axial direction of the shaft 42. The magnetic flux concentration rings 63A, 63B are arranged radially outward of the yoke rings 66A, 66B and are spaced apart from the yoke rings 66A, 66B, respectively. The first yoke ring 66A faces the first magnetic flux concentration ring 63A. The second yoke ring 66B faces the second magnetic flux concentration ring 63B.

Figure 6:
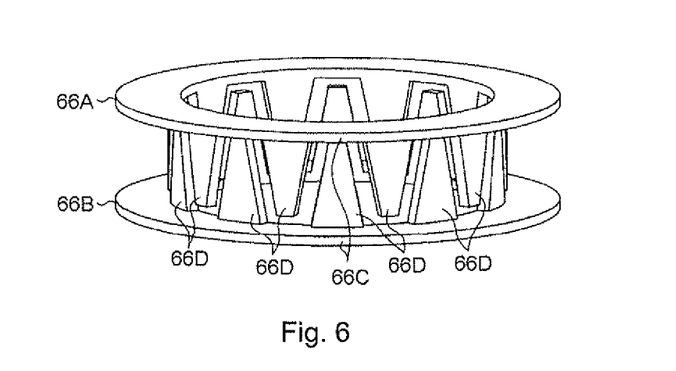
FIG. 6 is a perspective view that shows the perspective structure of yoke rings of the rotation angle sensor.

As shown in FIG. 6, each of the yoke rings 66A, 66B has an annular portion 66C and trapezoidal magnetic pole facing portions 66D. The magnetic pole facing portions 66D extend from the annular portion 66C in the axial direction (see FIG. 2) of the shaft 42. The magnetic pole facing portions 66D of each of the yoke rings 66A, 66B face the outer surface (see FIG. 2) of the permanent magnet 68.

Figure 7:
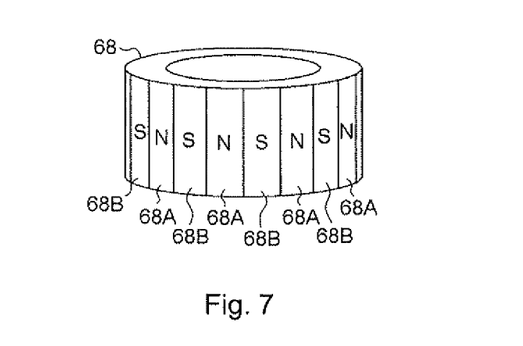
FIG. 7 is a perspective view that shows the perspective structure of a permanent magnet of the rotation angle sensor.

As shown in FIG. 7, the permanent magnet 68 has first magnetic poles 68A that constitute N-poles and second magnetic poles 68B that constitute S-poles. The first magnetic poles 68A and the second magnetic poles 68B are alternately provided in the rotation direction of the shaft 42.

Hereinafter, the resin mold element 67 and the permanent magnet 68 that rotate together with the shaft 42 will be referred to as "first sensor element". The Hall element 62, the magnetic flux concentration rings 63A, 63B, the resin mold elements 64 and 65 and the yoke rings 66A, 66B that are connected to a portion of the housing 41, which corresponds to the first sensor element, will be referred to as "second sensor element".

Figure 8:
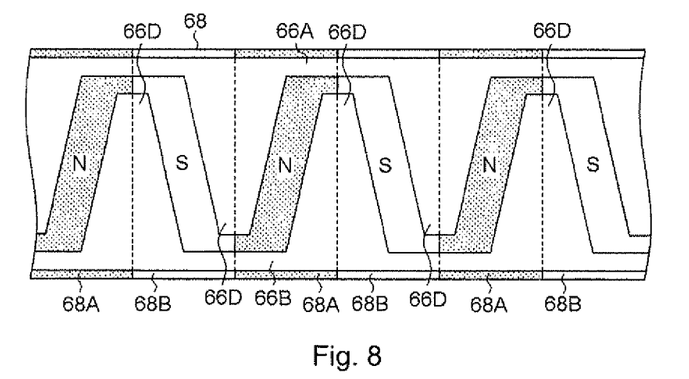
FIG. 8 is an expansion plan that shows a positional relationship between the yoke rings and the permanent magnet when the rotation position of the rotor is a rotation neutral position.

The principle of detection of the rotation angle of the shaft 42 based on the rotation position of the rotor 54 will be described with reference to FIG. 8 to FIG. 10. FIG. 8 shows the rotation position of the permanent magnet 68 with respect to the yoke rings 66A, 66B when the rotor 54 is in the rotation neutral position (see FIG. 3).

As shown in FIG. 8, when the rotor 54 is in the rotation neutral position, the magnetic pole facing portions 66D of each of the yoke rings 66A, 66B face the first magnetic poles 68A and the second magnetic poles 68B. At this time, the yoke rings 66A, 66B are located such that the area of portions of the magnetic pole facing portions 66D, which face the first magnetic poles 68A, is equal to the area of portions of the magnetic pole facing portions 66D, which face the second magnetic poles 68B.

In the electric valve device 40, when the rotation position of the rotor 54 with respect to the stator 51 is changed, the rotation position of the permanent magnet 68 with respect to the yoke rings 66A, 66B is changed. FIG. 9 shows the rotation position of the permanent magnet 68 with respect to the yoke rings 66A, 66B when the rotor 54 is in the first rotation position (see FIG. 4A). FIG. 10 shows the rotation position of the permanent magnet 68 with respect to the yoke rings 66A, 66B when the rotor 54 is in the second rotation position (see FIG. 4B).

Figure 9:
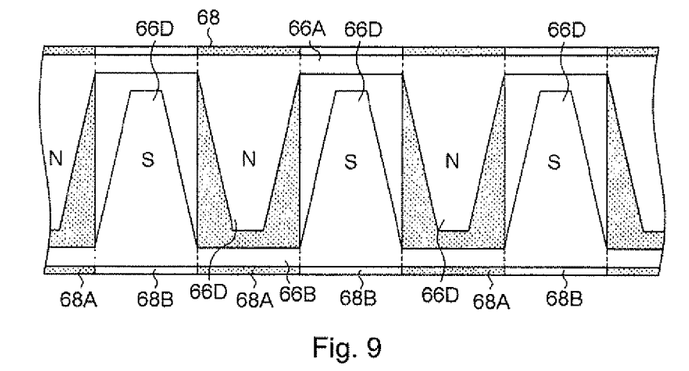
FIG. 9 is an expansion plan that shows a positional relationship between the yoke rings and the permanent magnet when the rotation position of the rotor is the first rotation position.

As shown in FIG. 9, when the rotor 54 is in the first rotation position, the area of portions of the magnetic pole facing portions 66D of the first yoke ring 66A, which face the first magnetic poles 68A, is larger than that when the rotor 54 is in the rotation neutral position. In addition, the area of portions of the magnetic pole facing portions 66D of the second yoke ring 66B, which face the second magnetic poles 68B, is larger than that when the rotor 54 is in the rotation neutral position. In the case where the area of portions of the magnetic pole facing portions 66D of the first yoke ring 66A, which face the first magnetic poles 68A, is "area N1" and the area of portions of the magnetic pole facing portions 66D of the second yoke ring 66B, which face the second magnetic poles 68B, is "area S2", changes in the area N1 and changes in the area S1 are in synchronization with each other. As a result of an increase in the area N1 and the area S2 as described above, magnetic fluxes headed from the annular portion 66C of the first yoke ring 66A toward the annular portion 66C of the second yoke ring 66B are generated. The density of the magnetic fluxes increases as the area N1 and the area S2 increase.

Figure 10:
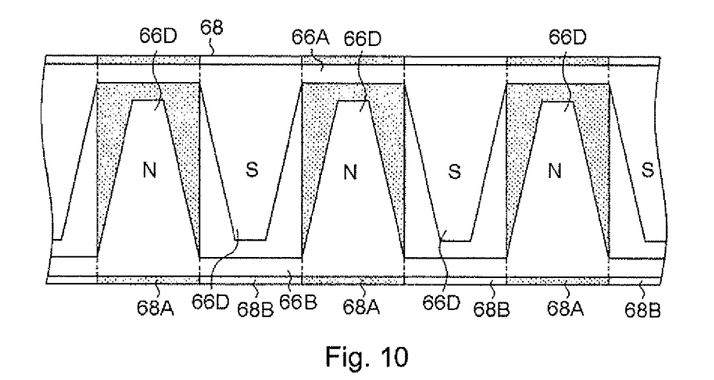
FIG. 10 is an expansion plan that shows a positional relationship between the yoke rings and the permanent magnet when the rotation position of the rotor is the second rotation position.

As shown in FIG. 10, when the rotor 54 is in the second rotation position, the area of portions of the magnetic pole facing portions 66D of the first yoke ring 66A, which face the second magnetic poles 68B, is larger than that when the rotor 54 is in the rotation neutral position. In addition, the area of portions of the magnetic pole facing portions 66D of the second yoke ring 66B, which face the first magnetic poles 68A, is larger than that when the rotor 54 is in the rotation neutral position. In the case where the area of portions of the magnetic pole facing portions 66D of the first yoke ring 66A, which face the second magnetic poles 68B, is "area S1" and the area of portions of the magnetic pole facing portions 66D of the second yoke ring 66B, which face the first magnetic poles 68A, is "area N2", changes in the area S1 and changes in the area N2 are in synchronization with each other. As a result of an increase in the area S1 and the area N2 as described above, magnetic fluxes directed from the annular portion 66C of the first yoke ring 66A toward the annular portion 66C of the second yoke ring 66B are generated. The density of the magnetic fluxes increases as the area S1 and the area N2 increase.

As described above, by detecting the density of magnetic fluxes directed from the annular portion 66C of the first yoke ring 66A toward the annular portion 66C of the second yoke ring 66B or the density of magnetic fluxes directed from the annular portion 66C of the second yoke ring 66B toward the annular portion 66C of the first yoke ring 66A with the use of the Hall element 62, the rotation angle sensor 60 is able to detect the rotation position of the rotor 54. In addition, because the rotation of the rotor 54 is in synchronization with the rotation of the shaft 42, it is possible to detect the rotation angle of the shaft 42. In the electric valve device 40 in which the rotatable range of the shaft 42 is smaller than 360°, the range in which the rotation angle of the shaft 42 is detectable by the rotation angle sensor 60 is smaller than 360°. Note that the "detectable range" here includes the range in which the substantially detectable angle is smaller than 360°, and, for example, the detectable range of a sensor that detects 361° as 1° is smaller than 360°.

In addition, the magnetic flux concentration rings 63A, 63B are respectively provided radially outward of the yoke rings 66A, 66B, and the Hall element 62 is provided between the protruding portions 63D of the magnetic flux concentration rings 63A, 63B. Therefore, the rotation angle sensor 60 is able to accurately detect the rotation position of the rotor 54 (the rotation angle of the shaft 42).

As shown in FIG. 2, the rotary valve 70 includes a port forming member 71 and the valve element 76. The port forming member 71 has ports 72 to 75. The valve element 76 rotates with respect to the port forming member 71. The valve element 76 is formed of the valve element portion 42C of the shaft 42. Therefore, in the following description of the configuration, "the valve element 76" is the same as "the valve element portion 42C".

The cylindrical port forming member 71 has an internal space 71S in which the valve element 76 is provided. The port forming member 71 is a valve seat fixed to the housing 41, and forms flow passages for the hydraulic fluid together with the valve element 76. The pump port 72, the first port 73 and the second port 74 are formed in the port forming member 71. The pump discharge oil passage 92 is connected to the pump port 72. The first supply oil passage 93 is connected to the first port 73. The second supply oil passage 94 is connected to the second port 74.

The pump port 72 is formed of an annular groove 72A and communication holes 72B. The annular groove 72A is formed in the outer periphery of the port forming member 71. The communication holes 72B provide communication between the annular groove 72A and the internal space 71S. The pump discharge oil passage 92 is connected to the annular groove 72A, and hydraulic fluid discharged from the electric pump 24 flows into the pump port 72.

The first port 73 is formed of an annular groove 73A, longitudinal grooves 73C and communication holes 73B. The annular groove 73A is formed in the outer periphery of the port forming member 71. The longitudinal grooves 73C are formed in the inner periphery of the port forming member 71, and extend in the axial direction. The communication holes 73B provide communication between the annular groove 73A and the longitudinal grooves 73C. The first supply oil passage 93 is connected to the annular groove 73A, and the hydraulic fluid is supplied from the first port 73 to the first hydraulic chamber 21A.

The second port 74 is formed of an annular groove 74A, longitudinal grooves 74C and communication holes 74B. The annular groove 74A is formed in the outer periphery of the port forming member 71. The longitudinal grooves 74C are formed in the inner periphery of the port forming member 71, and extend in the axial direction. The communication holes 74B provide communication between the annular groove 74A and the longitudinal grooves 74C. The second supply oil passage 94 is connected to the annular groove 74A, and the hydraulic fluid is supplied from the second port 74 to the second hydraulic chamber 21B.

The annular grooves 72A, 73A, 74A are formed at positions different from each other in the axial direction of the port forming member 71, that is, the axial direction of the valve element 76. Similarly, the communication holes 72B, 73B, 74B are also formed at positions from each other in the axial direction of the valve element 76.

Figure 11:
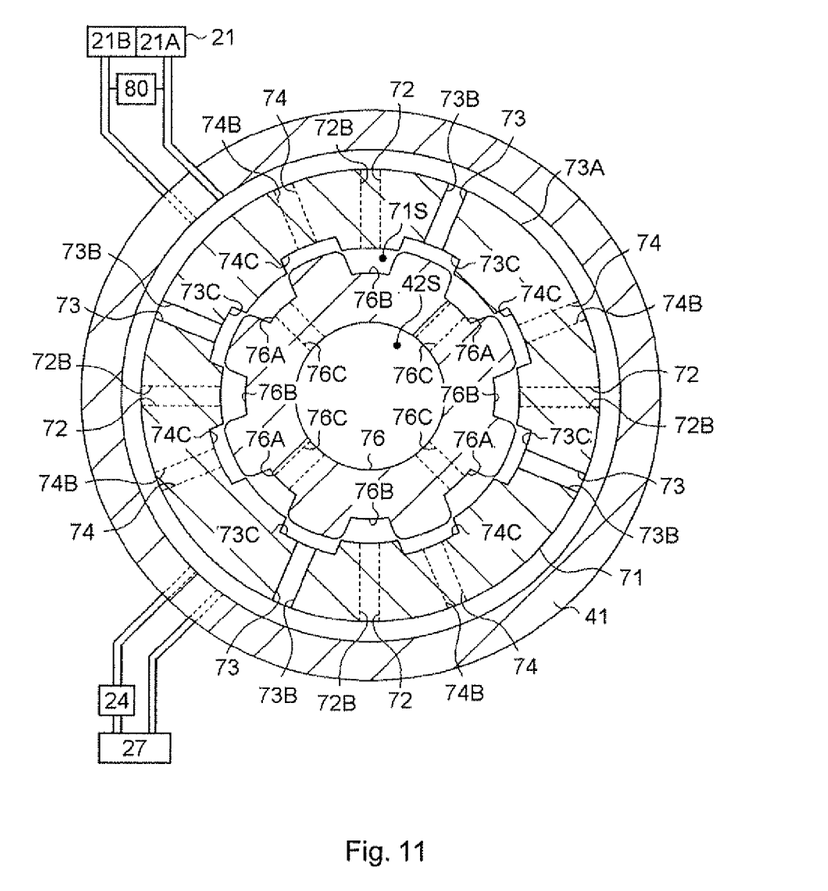
FIG. 11 is a sectional view taken along the line A-A in FIG. 2 when the rotation position of the rotor is the rotation neutral position.

As shown in FIG. 11, the annular groove 73A is formed along the circumferential direction of the port forming member 71, that is, the rotation direction of the valve element 76. Similarly, the annular grooves 72A, 74A are also formed in the rotation direction of the valve element 76. The longitudinal grooves 73C, 74C are formed at equal intervals in the rotation direction of the valve element 76. In the rotation direction of the valve element 76, the openings of the communication holes 72B that communicate with the internal space 71S are arranged between the longitudinal grooves 73C and the longitudinal grooves 74C.

As shown in FIG. 2, the tank port 75 is formed by the housing 41 and the end face of the port forming member 71 in the axial direction of the valve element 76. The drain oil passage 95 is connected to the tank port 75, and the hydraulic fluid is drained from the tank port 75 to the reservoir unit 27.

As shown in FIG. 11, first valve element grooves 76A, second valve element grooves 76B and inlet communication holes 76C are formed in the valve element 76. The first valve element grooves 76A and the second valve element grooves 76B are connected to the longitudinal grooves 73C or the longitudinal grooves 74C in accordance with the rotation position of the valve element 76 with respect to the port forming member 71. The inlet communication holes 76C provide communication between the first valve element grooves 76A and the internal space 42S of the valve element 76. In addition, as shown in FIG. 2, an outlet communication hole 76D is formed in the valve element 76. The outlet communication hole 76D provides communication between the tank port 75 and the internal space 42S of the valve element 76.

The mode of connection among the ports 72 to 75 based on the rotation position of the valve element 76 with respect to the port forming member 71 will be described with reference to FIG. 11 to FIG. 13. FIG. 10 shows the rotation position of the valve element 76 with respect to the port forming member 71 when the rotor 54 is in the rotation neutral position (see FIG. 3).

As shown in FIG. 11, when the rotor 54 is in the rotation neutral position, the pump port 72 is in communication with the first port 73 and the second port 74 via a clearance between the port forming member 71 and the valve element 76. In addition, at this time, the tank port 75 (see FIG. 2) is also in communication with the first port 73 and the second port 74. The mode in which the pump port 72 is in communication with the first port 73 and the second port 74 as described above will be referred to as "neutral mode".

In the electric valve device 40, when the rotation position of the rotor 54 with respect to the stator 51 is changed, the rotation position of the valve element 76 with respect to the port forming member 71 is changed. FIG. 12 shows the rotation position of the valve element 76 with respect to the port forming member 71 when the rotor 54 is in the first rotation position (see FIG. 4A). In addition, FIG. 13 shows the rotation position of the valve element 76 with respect to the port forming member 71 when the rotor 54 is in the second rotation position (see FIG. 4B).

Figure 12:
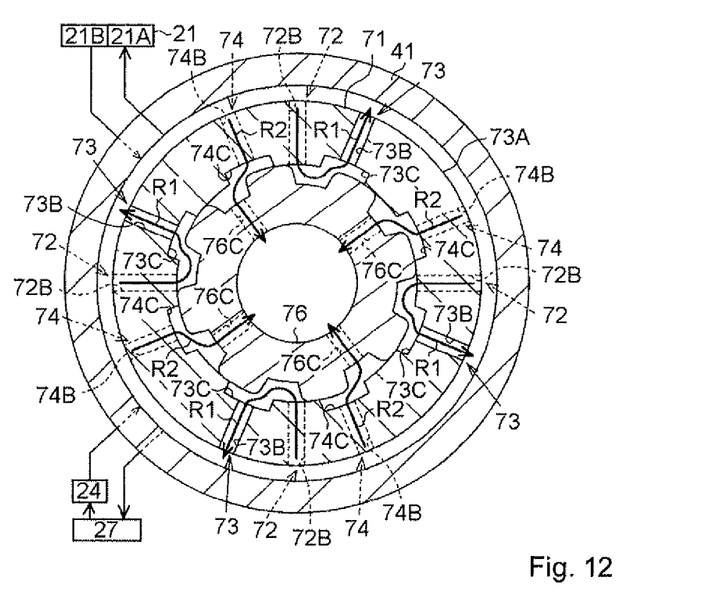
FIG. 12 is a sectional view taken along the line A-A in FIG. 2 when the rotation position of the rotor is the first rotation position.

As shown in FIG. 12, when the rotor 54 is in the first rotation position, the pump port 72 is in communication with the first port 73. In addition, at this time, the tank port 75 (see FIG. 2) is in communication with the second port 74. The mode in which the pump port 72 is in communication with the first port 73 with a flow passage area larger than that in the neutral mode will be referred to as "first mode".

Figure 13:
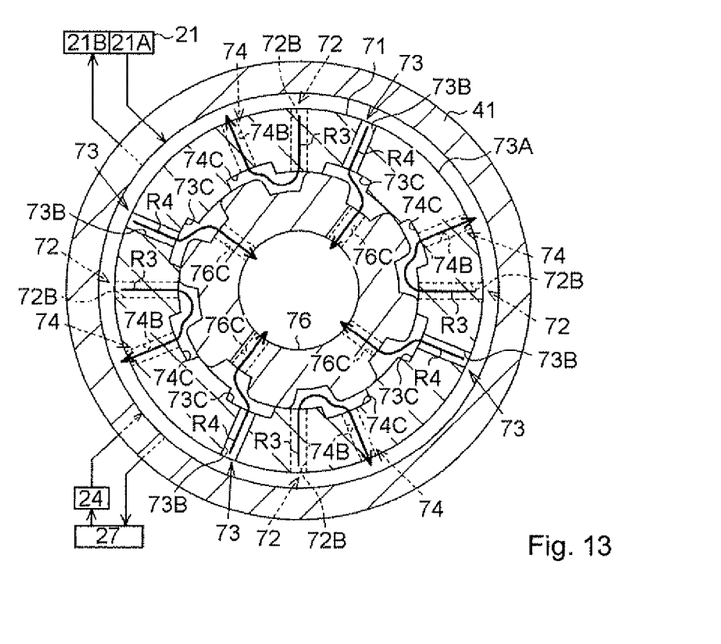
FIG. 13 is a sectional view taken along the line A-A in FIG. 2 when the rotation position of the rotor is the second rotation position.

As shown in FIG. 13, when the rotor 54 is in the second rotation position, the pump port 72 is in communication with the second port 74. In addition, at this time, the tank port 75 (see FIG. 2) is in communication with the first port 73. The mode in which the pump port 72 is in communication with the second port 74 with a flow passage area larger than that in the neutral mode will be referred to as "second mode".

The mode changes among the neutral mode, the first mode and the second mode on the basis of the position of the rotor 54. That is, when the rotation position of the rotor 54 changes from the rotation neutral position or the second rotation position to the first rotation position, the mode of connection among the ports 72 to 75 becomes the first mode. When the rotation position of the rotor 54 changes from the rotation neutral position or the first rotation position to the second rotation position, the mode of connection among the ports 72 to 75 becomes the second mode. When the rotation position of the rotor 54 changes from the first rotation position or the second rotation position to the rotation neutral position, the mode of connection among the ports 72 to 75 becomes the neutral mode.

The flow of the hydraulic fluid will be described with reference to FIG. 2, and FIG. 11 to FIG. 13. Note that the flow of the hydraulic fluid will be described below on the assumption that the bypass valve 80 interrupts communication between the first hydraulic chamber 21A and the second hydraulic chamber 21B.

(A) The flow of the hydraulic fluid in the neutral mode will be described. In the neutral mode, the hydraulic fluid discharged from the electric pump 24 (FIG. 2) is supplied to the longitudinal grooves 73C, 74C (FIG. 11) of the ports 73, 74 through the pump discharge oil passage 92, the annular groove 72A and the communication holes 72B of the pump port 72 and the second valve element grooves 76B. In addition, the hydraulic fluid is drained from the electric valve device 40 to the reservoir unit 27 through the longitudinal grooves 73C, 74C of the ports 73, 74, the first valve element grooves 76A, the inlet communication holes 76C, the internal space 42S, the outlet communication hole 76D (FIG. 2), the tank port 75 and the drain oil passage 95.

(B) The flow of the hydraulic fluid in the first mode will be described. In the first mode, the hydraulic fluid discharged from the electric pump 24 (FIG. 2) is supplied to the first hydraulic chamber 21A via the pump discharge oil passage 92, the annular groove 72A and the communication holes 72B of the pump port 72, the second valve element grooves 76B, the longitudinal grooves 73C (FIG. 12), the communication holes 73B and the annular groove 73A of the first port 73 and the first supply oil passage 93 (FIG. 2). That is, in the electric valve device 40, the hydraulic fluid flows as indicated by arrows R1 in FIG. 12.

In addition, in the first mode, the hydraulic fluid in the second hydraulic chamber 21B is drained to the reservoir unit 27 via the second supply oil passage 94, the annular groove 74A, the communication holes 74B and the longitudinal grooves 74C of the second port 74, the first valve element grooves 76A (FIG. 12), the inlet communication holes 76C, the internal space 42S, the outlet communication hole 76D (FIG. 2), the tank port 75 and the drain oil passage 95. That is, in the electric valve device 40, the hydraulic fluid flows as indicated by arrows R2 in FIG. 12.

(C) The flow of the hydraulic fluid in the second mode will be described. In the second mode, the hydraulic fluid discharged from the electric pump 24 (FIG. 2) is supplied to the second hydraulic chamber 21B via the pump discharge oil passage 92, the annular groove 72A and the communication holes 72B of the pump port 72, the second valve element grooves 76B, the longitudinal grooves 74C (FIG. 13), the communication holes 74B and the annular groove 74A of the second port 74 and the second supply oil passage 94 (FIG. 2). That is, in the electric valve device 40, the hydraulic fluid flows as indicated by arrows R3 in FIG. 13.

In addition, in the second mode, the hydraulic fluid in the first hydraulic chamber 21A is drained to the reservoir unit 27 via the first supply oil passage 93, the annular groove 73A (FIG. 13), the communication holes 73B and the longitudinal grooves 73C of the first port 73, the first valve element grooves 76A, the inlet communication holes 76C, the internal space 42S, the outlet communication hole 76D (FIG. 2), the tank port 75 and the drain oil passage 95. That is, in the electric valve device 40, the hydraulic fluid flows as indicated by arrows R4 in FIG. 13.

As described above, the flow rate of the hydraulic fluid that flows through the electric valve device 40, that is, the flow rate of the hydraulic fluid that flows into the hydraulic fluid supply port that is one of the first hydraulic chamber 21A and the second hydraulic chamber 21B and the flow rate of the hydraulic fluid that flows out of the hydraulic fluid drain port that is the other one of the first hydraulic chamber 21A and the second hydraulic chamber 21B, vary depending on the rotation angle of the shaft 42. The rotation angle of the shaft 42 is set to control the following four opening degrees.

(a) First supply opening degree based on which the amount of the hydraulic fluid that is supplied to the first hydraulic chamber 21A is changed.

(b) Second supply opening degree based on which the amount of the hydraulic fluid that is supplied to the second hydraulic chamber 21B is changed.

(c) First drain opening degree based on which the amount of the hydraulic fluid that is drained from the first hydraulic chamber 21A is changed.

(d) Second drain opening degree based on which the amount of the hydraulic fluid that is drained from the second hydraulic chamber 21B is changed.

The above-described opening degrees correspond to the following portions of the electric valve device 40. The first supply opening degree corresponds to the area of a passage that provides communication between the longitudinal grooves 73C of the first port 73 and the second valve element grooves 76B. The second supply opening degree corresponds to the area of a passage that provides communication between the longitudinal grooves 74C of the second port 74 and the second valve element grooves 76B. The first drain opening degree corresponds to the area of a passage that provides communication between the longitudinal grooves 73C of the first port 73 and the first valve element grooves 76A. The second drain opening degree corresponds to the area of a passage that provides communication between the longitudinal grooves 73C of the second port 74 and the second valve element grooves 76B.

The first supply opening degree and the second drain opening degree increase as the rotor 54 rotates in the direction of the arrow Y1 in FIG. 3 from the rotation neutral position. As the first supply opening degree and the second drain opening degree increase, the flow rate of the hydraulic fluid that is supplied to the first hydraulic chamber 21A and the flow rate of the hydraulic fluid that is drained from the second hydraulic chamber 21B increase. On the other hand, the first drain opening degree and the second supply opening degree increase as the rotor 54 rotates in the direction of the arrow Y2 shown in FIG. 3 from the rotation neutral position. As the first drain opening degree and the second supply opening degree increase, the flow rate of the hydraulic fluid that is drained from the first hydraulic chamber 21A and the flow rate of the hydraulic fluid that is supplied to the second hydraulic chamber 21B increase.

The mode of control on the electric valve device 40, which is executed by the control unit 30, will be described below. The control unit 30 controls the position of the valve element 76 of the electric valve device 40 on the basis of an operating state of the steering wheel 2. That is, when the steering wheel 2 is not operated, the control unit 30 controls the electric motor 50 such that the rotation position of the rotor 54 becomes the rotation neutral position, and places the electric valve device 40 in the neutral mode. In addition, when the steering wheel 2 is rotated clockwise, the control unit 30 controls the electric motor 50 such that the rotation position of the rotor 54 becomes the first rotation position, and places the electric valve device 40 in the first mode. In addition, when the steering wheel 2 is rotated counterclockwise, the control unit 30 controls the electric motor 50 such that the rotation position of the rotor 54 becomes the second rotation position, and places the electric valve device 40 in the second mode.

The operation of the hydraulic power steering system 1 will be described below. The control unit 30 detects the steering torque applied to the steering shaft 11 that is a steering member with the use of the torque sensor 14, and controls the electric motor 50 on the basis of the steering torque. That is, the electric motor 50 is controlled on the basis of the operation of the steering wheel 2. At this time, part of the shaft 42 which is rotated by the electric motor 50, that is, the valve element portion 42C, is formed as the valve element 76 of the rotary valve 70 that adjusts the flow rate of hydraulic fluid. Therefore, the rotor 54 of the electric motor 50 and the valve element 76 of the rotary valve 70 rotate together with each other. The control unit 30 detects the rotation angle of the shaft 42 part of which is formed as the valve element 76 of the rotary valve 70, that is, the rotation angle of the valve element 76 of the rotary valve 70, with the use of the rotation angle sensor 60, and controls the electric motor 50 on the basis of the rotation angle of the valve element 76. That is, when the control unit 30 controls the rotation angle of the valve element 76, the control unit 30 executes feedback control on the basis of the rotation angle of the valve element 76, which is detected by the rotation angle sensor 60.

The hydraulic power steering system 1 according to the present embodiment produces the following advantageous effects.

(1) The hydraulic power steering system 1 includes the rotation angle sensor 60 that detects the rotation angle of the shaft 42 of the electric motor 50, and the rotary valve 70 includes the valve element 76 that rotates together with the shaft 42 of the electric motor 50 and the housing 41 that has an internal space connected to the pump discharge oil passage 92, the first supply oil passage 93 and the second supply oil passage 94. The control unit 30 reflects the output from the rotation angle sensor 60, on the control of the electric motor 50. With the above configuration, the valve element 76 of the rotary valve 70 rotates together with the shaft 42 of the electric motor 50, and the rotation angle sensor 60 detects the rotation angle of the shaft 42 of the electric motor 50. Then, the control unit 30 reflects the output from the rotation angle sensor 60, on the control of the electric motor 50. Therefore, it is possible to accurately execute angular control of the valve element 76 of the rotary valve 70, and, consequently, it is possible to accurately control the supply amount of the hydraulic fluid.

(2) The shaft 42 of the electric motor 50 has the valve element 76, the first sensor element and the rotor 54 in order of the valve element 76, the first sensor element and the rotor 54 along the axial direction of the shaft 42. In the above configuration, the rotation angle sensor 60 is located closer to the valve element 76, than in the configuration where the shaft 42 has the valve element 76, the first sensor element and the rotor 54 in order of the valve element 76, the rotor 54 and the first sensor element along the axial direction of the shaft 42. Therefore, it is possible to accurately detect the rotation angle of the valve element 76 of the rotary valve 70.

(3) The shaft 42 of the electric motor 50 has the valve element 76, the first sensor element and the rotor 54 in order of the valve element 76, the first sensor element and the rotor 54 along the axial direction of the shaft 42, and the housing 41 has the valve chamber 41A that accommodates the valve element 76, the machine chamber 41B that accommodates the first sensor element and the rotor 54, and the oil seal 44 that separates the valve chamber 41A and the machine chamber 41B from each other. With the above configuration, the valve chamber 41A and the machine chamber 41B of the housing 41 are separated from each other by the single oil seal 44, unlike the configuration in which the shaft 42 has the valve element 76, the first sensor element and the rotor 54 in order of the first sensor element, the valve element 76 and the rotor 54 along the axial direction of the shaft 42. The oil seal 44 is able to prevent the hydraulic fluid flowing into the valve chamber 41A that accommodates the valve element 76 from flowing into the machine chamber 41B that accommodate the first sensor element and the rotor 54.

(4) The hydraulic power steering system 1 includes the Hall IC sensor as the rotation angle sensor 60. Generally, as the range of rotation angles detected by a Hall element is narrowed, the rotation angle resolution at the time of A/D conversion of an electric signal output from the Hall element increases, and it is therefore possible to output a minute detection result of the rotation angle. Therefore, it is possible to output a minute detection result of the rotation angle through Hall effect. As a result, it is possible to increase the resolution for the rotation angle of the shaft 42 of the electric motor 50 that does not rotate 360°.

(5) The hydraulic power steering system 1 includes the two-phase brushless motor as the electric motor 50. Therefore, the size, weight and cost of the hydraulic power steering system 1 are reduced by simplifying, for example, the coils 53 and the stator core 52, in comparison with the configuration in which the hydraulic power steering system 1 includes a three-phase brushless motor as the electric motor 50.

The invention includes embodiments other than the above-described embodiment. Hereinafter, modified examples of the above-described embodiment will be described as alternative embodiments of the invention. Note that the following alternative embodiments may be implemented in combination.

In the electric valve device 40 according to the above-described embodiment (FIG. 2), the bearings 45, 47 and the bearing 46 support the shaft 42. Alternatively, the type, arrangement and number of bearings that support the shaft 42 may be changed.

In the electric valve device 40 according to the above-described embodiment (FIG. 2), the shapes of the ports 72 to 75 and the shape of the valve element 76 may be changed. That is, the structure of the rotary valve 70 may be changed.

In the electric valve device 40 according to the above-described embodiment (FIG. 2), the valve 70, the rotation angle sensor 60 and the electric motor 50 are arranged in this order along the axial direction of the shaft 42. Alternatively, the order of arrangement of the electric motor 50, the rotation angle sensor 60 and the rotary valve 70 may be changed. That is, the shaft 42 of the electric motor 50 may have the valve element 76, the first sensor element and the rotor 54 in order of the first sensor element, the valve element 76 and the rotor 54 along the axial direction of the shaft 42. With the above configuration as well, a similar advantageous effect to that in the above description (2) is obtained.

In the electric valve device 40 according to the above-described embodiment (FIG. 2), the rotary valve 70, the rotation angle sensor 60 and the electric motor 50 are arranged in this order along the axial direction of the shaft 42. Alternatively, the rotary valve 70, the electric motor 50 and the rotation angle sensor 60 may be arranged in this order. That is, the shaft 42 of the electric motor 50 may have the valve element 76, the first sensor element and the rotor 54 in order of the valve element 76, the rotor 54 and the first sensor element along the axial direction of the shaft 42. With the above configuration as well, an oil seal is located between the rotary valve 70 and the electric motor 50 provided next to the rotary valve 70. Therefore, a similar advantageous effect to that in the above description (5) is obtained.

In the electric valve device 40 according to the above-described embodiment (FIG. 2), the electric motor 50 is formed of a two-phase brushless motor. Alternatively, the structure of the electric motor 50 may be changed. That is, the number of poles and number of phases of the electric motor 50 may be changed. In addition, the electric motor 50 may be a brushed motor.

In the electric valve device 40 according to the above-described embodiment (FIG. 2), the rotation angle sensor 60 includes the first magnetic flux concentration ring 63A and the second magnetic flux concentration ring 63B. Alternatively, the first magnetic flux concentration ring 63A and the second magnetic flux concentration ring 63B may be omitted.

In the electric valve device 40 according to the above-described embodiment (FIG. 2), the rotation angle sensor 60 includes the permanent magnet 68 and the Hall element 62. Alternatively, a rotation angle sensor that does not utilize Hall effect may be provided in place of the rotation angle sensor 60.

What is claimed is:

1. A hydraulic power steering system that includes: an oil pump; a steering assist device that is operated by hydraulic fluid supplied from the oil pump; a flow rate control valve that controls a flow of the hydraulic fluid that is supplied from the oil pump to the steering assist device; an electric motor that drives the flow rate control valve; a first oil passage that connects the oil pump and the flow rate control valve with each other; a second oil passage that connects the steering assist device and the flow rate control valve with each other; and a control unit that controls the electric motor, comprising:
   a rotation angle sensor that detects a rotation angle of an output shaft of the electric motor, wherein
   the flow rate control valve includes a rotary valve that rotates together with the output shaft of the electric motor and a housing that has an internal space connected to the first oil passage and the second oil passage, and
   the control unit reflects an output from the rotation angle sensor on control of the electric motor.

2. The hydraulic power steering system according to claim 1, wherein:
   the rotation angle sensor includes a first sensor element that rotates together with the output shaft of the electric motor and a second sensor element that is attached to a portion of the housing, which corresponds to the first sensor element; and
   the electric motor includes a stator that is attached to the housing and a rotor that is attached to a position of the output shaft of the electric motor, which corresponds to the stator.

3. The hydraulic power steering system according to claim 2, wherein
   the output shaft of the electric motor has the rotary valve, the first sensor element and the rotor in order of the rotary valve, the first sensor element and the rotor along an axial direction of the output shaft or in order of the first sensor element, the rotary valve and the rotor along the axial direction of the output shaft.

4. The hydraulic power steering system according to claim 2, wherein:
   the output shaft of the electric motor has the rotary valve, the first sensor element and the rotor in order of the rotary valve, the first sensor element and the rotor along an axial direction of the output shaft or in order of the rotary valve, the rotor and the first sensor element along the axial direction of the output shaft; and
   the housing has a first accommodation chamber that accommodates the rotary valve, a second accommodation chamber that accommodates the first sensor element and the rotor, and an oil seal that separates the first accommodation chamber and the second accommodation chamber from each other.

5. The hydraulic power steering system according to claim 1, wherein
   a range in which the rotation angle is detectable by the rotation angle sensor is smaller than 360°.

6. The hydraulic power steering system according to claim 1, wherein
   a rotatable range of the output shaft of the electric motor is smaller than 360°.

* * * * *